United States Patent Office  3,272,859  
Patented Sept. 13, 1966

3,272,859  
PREPARATION OF HYDROXYNITRO-  
BENZOIC ACIDS  
Henry J. Peterson, Wilmington, Del., assignor to Sun Oil Company, Philadelphia, Pa., a corporation of New Jersey  
No Drawing. Filed Nov. 12, 1963, Ser. No. 323,070  
4 Claims. (Cl. 260—521)

This invention relates to a method for preparing hydroxynitrobenzoic acids. More particularly this invention relates to a method for preparing hydroxynitrobenzoic acids having the general formula

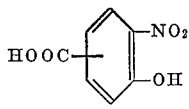

wherein the —COOH is in the meta- or para-positions with respect to the —NO$_2$. Hydroxynitrobenzoic acids having the above general formula find particular utility as bactericides and fungicides. They are also useful in the prevention of microbiological deterioration during leather manufacture, prevention of storage rot in tubers and as intermediates in the preparation of anti-tubercular drugs.

Heretofore these types of compounds have been prepared by a variety of methods. One such method involves the direct nitration of salicyclic acid. This method, however, has the disadvantages attendant with the handling of strongly acidic materials and also requires closely controlled conditions to insure the production of any appreciable yield of desired product. Other methods which have been reported for the preparation of nitrohydroxybenzoic acids include (1) treatment of dinitrobenzoic acid with dilute sodium hydroxide to form a mixture of nitrohydroxybenzoic acid salt isomers; (2) nitration of acetyl amino benzoic acid followed by basic hydrolysis to form the desired product; and (3) oxidation of nitro acetyl m-cresol with chromium trioxide.

A method has now been found wherein a hydroxynitrobenzoic acid having the general formula

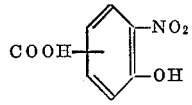

wherein the —COOH is in the meta- or para-position with respect to the —NO$_2$, can be prepared using a mono-nitrotoluene as the starting material.

According to the instant invention, a mono-nitrotoluene selected from the group consisting of meta- and para-nitrotoluene is contacted with a weight percent excess of powdered potassium hydroxide at a temperature in the range of 0° C. to 100° C. for a period of time in the range of 0.1 hour to 72 hours. For optimum conversion and yield it is preferred that the temperature employed be in the range of 20° C. to 90° C.

It is preferred that the mono-nitrotoluene be dissolved in an inert solvent such as benzene, toluene, or a saturated aliphatic hydrocarbon such as n-hexane prior to contacting with the powdered potassium hydroxide in order that a better contacting between the mono-nitrotoluene and the powdered potassium hydroxide be effected.

It is important in the practice of this invention that the mono-nitrotoluene be contacted with a weight percent excess of powdered potassium hydroxide. The weight ratios of powdered potassium hydroxide to mono-nitrotoluene which can be employed can be in the range of from 2:1 to 25:1, preferably 3:1 to 15:1.

In the instant process, water is formed as a by-product. Apparently since the instant products are not obtainable using aqueous potassium hydroxide, in the absence of a weight percent excess of powdered potassium hydroxide, the water of reaction would tend to deactivate the powdered potassium hydroxide by some mechanism such as by some mechanism such as by the formation of hydrates. Thus if an amount of powdered potassium hydroxide less than that specified herein is used, little or none of the desired product is obtained.

After the mono-nitrotoluene has been contacted with the powdered potassium hydroxide at a temperature in the range specified for a period of time specified above, the reaction mixture contains a multiplicity of compounds including the desired hydroxynitrobenzoic acid in the form of its dipotassium salt and unreacted mono-nitrotoluene and potassium hydroxide. To recover the desired acid product, water is first added to the reaction mixture. The unreacted mono-nitrotoluene is unaffected by the addition of the water. The unreacted potassium hydroxide dissolves in the water. If the amount of water added is sufficient only to form a concentrated solution of potassium hydroxide the solid dipotassium salts of hydroxynitrobenzoic acid are insoluble therein and can be conveniently separated by filtration. The salts are then dissolved in water. Upon acidification of the resulting solution with a mineral acid, hydroxynitrobenzoic acid is precipitated. The precipitated acid product is separated and recovered.

If the amount of water added to the reaction mixture is sufficient to form a less concentrated solution of potassium hydroxide, the dipotassium salts of hydroxynitrobenzoic acid will also be dissolved in the solution. Any unreacted mono-nitrotoluene can be removed at this point by extraction with a convenient solvent such as ether, benzene, or saturated aliphatic hydrocarbon such as hexane. Upon solidification of the aqueous solution with a mineral acid, hydroxynitrobenzoic acid is precipitated. The precipitated acid product is separated and recovered.

The following examples further illustrate the instant invention.

*Example I*

Into 20 ml. of benzene were placed 10 grams of p-nitrotoluene. The mixture was warmed on a steam bath to facilitate solution and then allowed to cool to room temperature. The cooled solution was poured over about 100 grams of freshly powdered potassium hydroxide contained in a porcelain dish. The reaction mixture was mixed until the powdered potassium hydroxide was thoroughly wet with the solution. The reaction mixture was placed in a desiccator overnight at ambient temperature (20° C.) to permit the reaction to proceed. The reaction mixture was dissolved in about 500 ml. of ice water and extracted with two 200 ml. portions of diethyl ether. The aqueous phase was acidified by the dropwise addition of concentrated hydrochloric acid. The precipitated material was recovered by filtration. It had a melting point of 230° C. as compared with a literature value of 230° C. for the melting point of 3-hydroxy-4-nitrobenzoic acid.

*Example II*

Example I was repeated except that o-nitrotoluene was used as the starting material. No hydroxynitrobenzoic acid product was obtained.

When m-nitrotoluene is used as the starting material a mixture of isomeric products are obtained, i.e., 4-nitro-5-hydroxybenzoic acid and 5-nitro-6-hydroxybenzoic acid.

I claim:

1. Method for preparing hydroxynitrobenzoic acids having the general formula

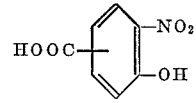

wherein the carboxyl radical occurs other than ortho to the nitro radical, which comprises contacting a mono-nitrotoluene selected from the group consisting of meta- and para-nitrotoluene with a weight percent excess of powdered potassium hydroxide at a temperature in the range of 0° C. to about 100° C., for a period of time in the range of 0.1 hour to 72 hours whereby the mono-nitrotoluene is converted to dipotassium salt of hydroxynitrobenzoic acid, acidifying said salt in aqueous solution with mineral acid, and thereafter separating and recovering said hydroxynitrobenzoic acid.

2. Method in accordance with claim 1 wherein the temperature is in the range of from 20° C. to 90° C. and the time is in the range of 5 hours to 24 hours.

3. Method for preparing 3-hydroxy-4-nitrobenzoic acid which comprises contacting p-nitrotoluene with a weight percent excess of powdered potassium hydroxide at a temperature in the range of 0° C. to about 100° C. for a period of time in the range of 0.1 hour to 72 hours whereby the p-nitrotoluene is converted to the dipotassium salt of 3-hydroxy-4-nitrobenzoic acid, acidifying said salt in aqueous solution, and thereafter separating and recovering said hydroxynitrobenzoic acid.

4. Method in accordance with claim 3 wherein the temperature is in the range of from 20° C. to 90° C. and the time is in the range of 5 hours to 24 hours.

No references cited.

LORRAINE A. WEINBERGER, *Primary Examiner.*

S. B. WILLIAMS, *Assistant Examiner.*